(12) United States Patent
Gong et al.

(10) Patent No.: US 11,401,585 B2
(45) Date of Patent: Aug. 2, 2022

(54) MULTICOMPONENT ALUMINUM ALLOYS FOR APPLICATIONS SUCH AS ADDITIVE MANUFACTURING

(71) Applicant: QUESTEK INNOVATIONS LLC, Evanston, IL (US)

(72) Inventors: Jiadong Gong, Evanston, IL (US); Gregory B. Olson, Riverwoods, IL (US); David R. Snyder, Des Plaines, IL (US); Thomas S. Kozmel, II, Evanston, IL (US)

(73) Assignee: QUESTEK INNOVATIONS LLC, Evanston, IL (US)

( * ) Notice: Subject to any disclaimer, the term of this patent is extended or adjusted under 35 U.S.C. 154(b) by 161 days.

(21) Appl. No.: 16/767,516

(22) PCT Filed: Nov. 28, 2018

(86) PCT No.: PCT/US2018/062761
§ 371 (c)(1),
(2) Date: May 27, 2020

(87) PCT Pub. No.: WO2019/108596
PCT Pub. Date: Jun. 20, 2019

(65) Prior Publication Data
US 2020/0370149 A1    Nov. 26, 2020

Related U.S. Application Data

(60) Provisional application No. 62/591,515, filed on Nov. 28, 2017.

(51) Int. Cl.
*C22C 21/00* (2006.01)
*C21D 9/00* (2006.01)
(Continued)

(52) U.S. Cl.
CPC ............. *C22C 21/00* (2013.01); *B22F 3/24* (2013.01); *B22F 9/08* (2013.01); *B22F 10/20* (2021.01);
(Continued)

(58) Field of Classification Search
CPC ....... C22C 21/00; C22C 1/0416; C22C 21/08; B22F 3/24; B22F 9/08; B22F 10/20;
(Continued)

(56) References Cited

U.S. PATENT DOCUMENTS 4,668,290 A    3/1987  Wang et al.
4,711,762 A   12/1987  Vernam et al.
(Continued)

FOREIGN PATENT DOCUMENTS

CN    107234240 A    10/2017
EP      0654320 A1    5/1995
(Continued)

OTHER PUBLICATIONS

Bartkowiak et al., "New Developments of Laser Processing Aluminium Alloys via Additive Manufacturing Technique," Physics Procedia, 2011, 12:393-401.
(Continued)

*Primary Examiner* — John A Hevey
(74) *Attorney, Agent, or Firm* — Michael Best & Friedrich LLP

(57) ABSTRACT

Materials, methods and techniques disclosed and contemplated herein relate to multicomponent aluminum alloys. Generally, multicomponent aluminum alloys include aluminum, nickel, zirconium, and rare earth elements, and include L12 precipitates having an Al3X composition. Rare earth elements used in example multicomponent aluminum alloys disclosed and contemplated herein include erbium (Er), zirconium (Zr), yttrium (Y), and ytterbium (Yb). Example
(Continued)

multicomponent aluminum alloys disclosed and contemplated herein are particularly suited for use in additive manufacturing operations.

20 Claims, 11 Drawing Sheets

(51) Int. Cl.

| | | |
|---|---|---|
| C22C 1/04 | (2006.01) | |
| B33Y 40/10 | (2020.01) | |
| B22F 3/24 | (2006.01) | |
| B22F 9/08 | (2006.01) | |
| C22C 21/08 | (2006.01) | |
| B22F 10/20 | (2021.01) | |
| B33Y 10/00 | (2015.01) | |
| B33Y 70/00 | (2020.01) | |
| C22F 1/047 | (2006.01) | |

(52) U.S. Cl.
CPC ............. *B33Y 40/10* (2020.01); *C21D 9/00* (2013.01); *C22C 1/0416* (2013.01); *C22C 21/08* (2013.01); *C22F 1/047* (2013.01); *B22F 2003/248* (2013.01); *B22F 2301/052* (2013.01); *B22F 2998/10* (2013.01); *B33Y 10/00* (2014.12); *B33Y 70/00* (2014.12)

(58) Field of Classification Search
CPC .......... B22F 2003/248; B22F 2301/052; B22F 2998/10; B22F 10/64; B33Y 40/10; B33Y 10/00; B33Y 70/00; C21D 9/00; Y02P 10/25; C22F 1/04; C22F 1/047
See application file for complete search history.

(56) References Cited

U.S. PATENT DOCUMENTS

| | | | |
|---|---|---|---|
| 4,861,391 A | 8/1989 | Rioja et al. | |
| 4,874,440 A | 10/1989 | Sawtell et al. | |
| 2004/0089382 A1 | 5/2004 | Senkov et al. | |
| 2006/0013719 A1 | 1/2006 | Ichikawa et al. | |
| 2009/0263266 A1* | 10/2009 | Pandey | C22C 21/00 419/25 |
| 2010/0143177 A1* | 6/2010 | Pandey | C22C 1/0416 419/30 |
| 2010/0226817 A1* | 9/2010 | Pandey | C22C 21/06 420/532 |
| 2011/0044843 A1 | 2/2011 | Misra et al. | |
| 2013/0312877 A1 | 11/2013 | Chakrabarti et al. | |
| 2014/0230974 A1 | 8/2014 | Lin et al. | |
| 2014/0271322 A1 | 9/2014 | Godfrey et al. | |
| 2016/0222493 A1 | 8/2016 | Saikawa et al. | |
| 2016/0228950 A1 | 8/2016 | Bodily et al. | |
| 2017/0247782 A1 | 8/2017 | Matsumoto et al. | |
| 2017/0314109 A1 | 11/2017 | McCloskey | |
| 2018/0010216 A1 | 1/2018 | Vo et al. | |
| 2018/0126457 A1 | 5/2018 | Hou et al. | |

FOREIGN PATENT DOCUMENTS

| | | |
|---|---|---|
| EP | 2110450 A1 | 10/2009 |
| EP | 2112240 A1 | 10/2009 |
| EP | 3034639 A1 | 6/2016 |
| EP | 3165620 A1 | 5/2017 |
| JP | H0776701 A | 3/1995 |
| JP | 2003277896 A | 10/2003 |
| JP | 2011-021218 A | 2/2011 |
| JP | 2011-510174 A | 2/2011 |
| JP | 2015-071823 A | 4/2015 |
| JP | 2017-155291 A | 9/2017 |
| WO | 2014/071135 A1 | 5/2014 |
| WO | 2014/144630 A1 | 9/2014 |
| WO | 2014/196987 A2 | 12/2014 |
| WO | 2016/199564 A1 | 12/2016 |
| WO | 2017/041006 A1 | 3/2017 |

OTHER PUBLICATIONS

Carpenter Technology, "A Clean Ti: A Gas Atomization Primer," <https://www.carpentertechnology.com/en/alloy-techzone/technical-information/technical-articles/a-clean-ti-a-gas-atomization-primer> webpage available as early as Nov. 13, 2018.

Desmukh et al., "Effect of aging treatments on the kinetics of fatigue crack growth in 7010 aluminum alloy" Materials Science and Engineering, Nov. 5, 2006 , vol. 435-436, pp. 318-326.

Dietrich et al., "A New Approach for a Flexible Powder Production for Additive Manufacturing," Procedia Manufacturing, 2016, 6: 88-95.

EIGA Systems, "Electrode Induction Melting Inert Gas Atomization Systems for Electrodes up to 150 mm Diameter and 1000 mm Length," <https://www.ald-vt.com/portfolio/engineering/vacuum-metallurgy/electrode-induction-melting-inert-gas-atomization/> webpage available as early as Nov. 13, 2018.

Erasteel, "Powder Metallurgy—ASP," <https://www.erasteel.com/technologies/powder-metallurgy-asp/> webpage available as early as Nov. 13, 2018.

Fulcher et al., "Comparison of ALSI10MG and AL6061 processed through DMLS," Proceedings of the Solid Freeform Fabrication (SFF) Symposium, 2014, 404-419.

Jones, "Engineering Design Data for Aluminum Alloy 7050-T73651 Plate," Air Force Materials Laboratory, 1973, 37 pages.

Reschetnik et al., "Fatigue crack growth behavior and mechanical properties of additively processed EN AW-7075 aluminium alloy," Procedia Structural Integrity, 2016, 2:3040-3048.

Robinson et al., "The influence of quench sensitivity on residual stresses in aluminum alloys 7010 and 7075" Materials Characterization, Jan. 6, 2012, vol. 65, pp. 73-85.

Roenning et al., "Constitutive Relationships for AlZnMg, AlZnMgCr, and AlZnMgZr Alloys," Metallurgical and Materials Transactions A, Mar. 2001, 32:769-776.

VIGA Systems, "Vacuum Induction Melting Inert Gas Atomization Systems for Charge Weights from 5 up to 2500 kg," <https://www.ald-vt.com/portfolio/engineering/vacuum-metallurgy/vacuum-induction-melting-inert-gas-atomization/> webpage available as early as Nov. 13, 2018.

Yuan et al., "Effect of Zr addition on properties of Al-Mg-Si aluminum alloy used for all aluminum alloy conductor," Materials and Design, 2011, 32(8-9): 4195-4200.

International Preliminary Reporton Patentability for Application No. PCT/US2016/050221 dated Nov. 22, 2016 (7 pages).

International Search Report and Written Opinion for Application No. PCT/US2016/050221 dated Nov. 22, 2016 (12 pages).

International Search Report and Written Opinion for Application No. PCT/US2018/062761 dated Feb. 7, 2019 (15 pages).

International Search Report and Written Opinion for Application No. PCT/US2018/062779 dated Nov. 1, 2019 (15 pages).

European Patent Office Extended Search Report for Application No. 18913552.8 dated Jun. 30, 2021 (15 pages).

Johannesson et al., "Effect of Si additions and heat treatment on the mechanical behaviour of an Al-5Mg casting alloy", International Journal of Cast Metals Research, vol. 17, No. 2, 2004, pp. 94-98.

European Patent Office Extended Search Report for Application No. 18884266.0 dated Aug. 6, 2021 (11 pages).

\* cited by examiner

MULTICOMPONENT ALUMINUM ALLOYS FOR APPLICATIONS SUCH AS ADDITIVE MANUFACTURING

CROSS-REFERENCE

The present application is a U.S. national stage entry of International Patent Application No. PCT/US2018/062761, filed on Nov. 28, 2018, which claims priority to U.S. provisional patent application number 62/591,515, filed on Nov. 28, 2017, the disclosures of each of which are hereby incorporated by reference in their entirety.

GOVERNMENT INTEREST

Aspects of the present disclosure were made with government support under contract number N00014-15-C-0158 awarded by the U.S. Office of Naval Research. The government has certain rights in the disclosure.

TECHNICAL FIELD

The present disclosure relates to materials, methods and techniques for manufacturing multicomponent alloys. Multicomponent aluminum alloys disclosed and contemplated herein are particularly suited for additive manufacturing applications.

INTRODUCTION

Additive manufacturing, also known as 3-D printing, is a fabrication technique that utilizes successive layer generation to produce an article of manufacture. Typically, additive manufacturing methods use powders, wires, or liquid bases to generate layers under direction of computer-aided design data. Example additive manufacturing processes include stereolithography, selective laser sintering (SLS), direct metal laser sintering (DMLS), electron beam melting (EBM), and laser powder deposition (LPD).

By allowing for net-shape fabrication of highly complex geometries without molds or machining, this process offers the potential to reduce material usage, energy consumption, component cost, and fabrication time. Additive manufacturing allows for rapid component production, one-off production of difficult-to-source parts, and production of parts difficult to produce by conventional means (such as complex geometries that cannot be machined or cast). As a result, additive manufacturing can provide flexibility in part manufacturing to original equipment manufacturers as well as end users acquiring custom or replacement parts.

SUMMARY

Materials, methods and techniques disclosed and contemplated herein relate to multicomponent aluminum alloys. Generally, multicomponent aluminum alloys include aluminum, nickel, zirconium, and rare earth elements, and include $L1_2$ precipitates having an $Al_3X$ composition. Rare earth elements used in example multicomponent aluminum alloys disclosed and contemplated herein include erbium (Er), zirconium (Zr), yttrium (Y), and ytterbium (Yb).

In one aspect, an alloy is disclosed. The alloy includes, by weight percentage, 1% to 4.2% nickel; 0.5% to 2.6% erbium; 0.1% to 1.5% zirconium; 0.05% to 0.3% yttrium; 0.1% to 1.2% ytterbium; and the balance of weight percent comprising aluminum and incidental elements and impurities. The alloy also includes $L1_2$ precipitates having an $Al_3X$ composition, where X is at least one of: erbium, zirconium, yttrium, and ytterbium.

In another aspect, an atomized alloy powder usable in additive manufacturing is disclosed. The atomized alloy powder comprises alloy particles. The alloy particles include, by weight percentage, 1% to 4.2% nickel; 0.5% to 2.6% erbium; 0.1% to 1.5% zirconium; 0.05% to 0.3% yttrium; 0.1% to 1.2% ytterbium; and the balance of weight percent comprising aluminum and incidental elements and impurities. The alloy particles also include $L1_2$ precipitates having an $Al_3X$ composition, where X is at least one of: erbium, zirconium, yttrium, and ytterbium.

In another aspect a method of using an atomized alloy powder in additive manufacturing is disclosed. The method includes receiving the atomized alloy powder comprising alloy particles, conducting additive manufacturing with the atomized alloy powder to generate a manufactured article, and aging the manufactured article in a heated container for a period of time. The atomized alloy powder comprises alloy particles. The alloy particles include, by weight percentage, 1% to 4.2% nickel; 0.5% to 2.6% erbium; 0.1% to 1.5% zirconium; 0.05% to 0.3% yttrium; 0.1% to 1.2% ytterbium; and the balance of weight percent comprising aluminum and incidental elements and impurities. The alloy particles also include $L1_2$ precipitates having an $Al_3X$ composition, where X is at least one of: erbium, zirconium, yttrium, and ytterbium.

There is no specific requirement that a material, technique or method relating to multicomponent aluminum alloys include all of the details characterized herein, in order to obtain some benefit according to the present disclosure. Thus, the specific examples characterized herein are meant to be exemplary applications of the techniques described, and alternatives are possible.

DETAILED DESCRIPTION

Figure 1:
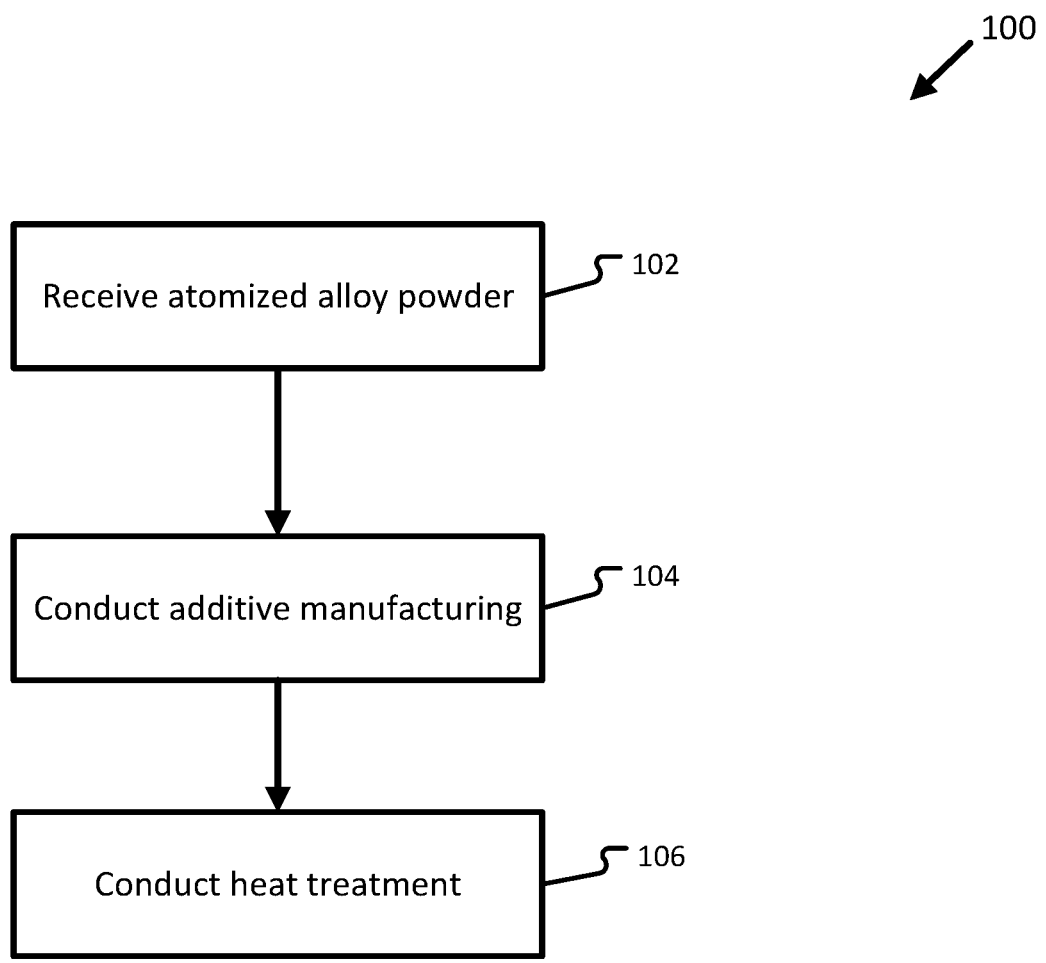
FIG. 1 shows photographs of an example method of using an atomized alloy powder in additive manufacturing.

Materials, methods and techniques disclosed and contemplated herein relate to multicomponent aluminum alloys. Example multicomponent aluminum alloys include aluminum-based alloys comprising one or more of: nickel (Ni), erbium (Er), zirconium (Zr), yttrium (Y), and ytterbium (Yb). The example multicomponent aluminum alloys can include $L1_2$ precipitates having an $Al_3X$ structure, where X is at least one of: erbium, zirconium, yttrium, and ytterbium.

Multicomponent aluminum alloys disclosed and contemplated herein are well suited for additive manufacturing applications. For instance, an atomized alloy powder usable in additive manufacturing can include alloy particles comprising multicomponent aluminum alloys disclosed and contemplated herein.

In some instances, example multicomponent aluminum alloys disclosed and contemplated herein can display improved processability, strength, and/or corrosion resistance in harsh environments, for instance, when compared to existing aluminum alloys. Example applications of multicomponent aluminum alloys disclosed and contemplated herein include aerospace, automotive, energy industries, as well as other applications where materials can be subjected to extreme temperature and/or loading conditions. Example applications of multicomponent aluminum alloys disclosed and contemplated herein also include those requiring materials that have high strength and/or are corrosion resistant. Various manufactured articles can be prepared using the multicomponent aluminum alloys disclosed herein, including for the aforementioned industries and the aforementioned applications.

I. Example Multicomponent Aluminum Alloys

Example multicomponent aluminum alloys can have a combination of hot tear resistance and strength, making them amenable to additive manufacturing for production of articles requiring high strength (e.g., aircraft components). Example multicomponent aluminum alloys are described below regarding example components and amounts, phase and nanostructure characteristics, physical properties, methods of manufacture, exemplary articles of manufacture, and exemplary methods of use.

A. Example Components and Amounts

Multicomponent aluminum alloys disclosed and contemplated herein include various components at various amounts. For instance, example multicomponent aluminum alloys include aluminum and one or more of: nickel (Ni), erbium (Er), zirconium (Zr), yttrium (Y), and ytterbium (Yb). Generally, as used herein, "multicomponent aluminum alloys" mean alloys including aluminum, nickel, and one or more "rare earth" elements, such as erbium, zirconium, yttrium, and/or ytterbium.

Example multicomponent aluminum alloys disclosed and contemplated herein include nickel (Ni). In various implementations, multicomponent aluminum alloys include 1 to 4 weight percent ("wt %") Ni; 1 wt % to 3 wt % Ni; 1 wt % to 2 wt % Ni; 2 wt % to 4 wt % Ni; or 2 wt % to 3 wt % Ni. In various implementations multicomponent aluminum alloys include 1 to 4.2 wt % Ni. In various implementations, example multicomponent aluminum alloys include no greater than 4 wt % Ni; no greater than 3 wt % Ni; or no greater than 2 wt % Ni.

Example multicomponent aluminum alloys disclosed and contemplated herein include erbium (Er). In various implementations, multicomponent aluminum alloys include 0.5 wt % to 2.6 wt % Er; 0.8 wt % to 2.4 wt % Er; 1.0 wt % to 2.2 wt % Er; 1.2 wt % to 1.8 wt % Er; 0.6 wt % to 1.6 wt % Er; 0.8 wt % to 1.4 wt % Er; 1.2 wt % to 2.3 wt % Er; 1.0 wt % to 1.4 wt % Er; to 1.0 wt % to 1.6 wt % Er.

Example multicomponent aluminum alloys disclosed and contemplated herein include zirconium (Zr). In various implementations, multicomponent aluminum alloys include 0.1 wt % to 1.5 wt % Zr; 0.3 wt % to 1.3 wt % Zr; 0.5 wt % to 1.0 wt % Zr; 0.3 wt % to 0.8 wt % Zr; 0.5 wt % to 1.3 wt % Zr; 0.7 wt % to 1.1 wt % Zr; or 0.9 wt % to 1.2 wt % Zr.

Example multicomponent aluminum alloys disclosed and contemplated herein include yttrium (Y). In various implementations, multicomponent aluminum alloys include 0.05 wt % to 0.3 wt % Y; 0.1 wt % to 0.2 wt % Y; 0.08 wt % to 0.2 wt % Y; 0.1 wt % to 0.25 wt % Y; 0.2 wt % to 0.3 wt % Y; 0.15 wt % to 0.25 wt % Y; or 0.09 wt % to 0.3 wt % Y.

Example multicomponent aluminum alloys disclosed and contemplated herein include ytterbium (Yb). In various implementations, multicomponent aluminum alloys include 0.1 wt % to 1.2 wt % Yb; 0.3 wt % to 1.0 wt % Yb; 0.5 wt % to 0.8 wt % Yb; 0.3 wt % to 0.8 wt % Yb; 0.5 wt % to 1.0 wt % Yb; 0.7 wt % to 1.1 wt % Yb; or 0.9 wt % to 1.2 wt % Yb.

Typically, example multicomponent aluminum alloys disclosed and contemplated herein significantly reduce, or eliminate, the use of scandium. In some implementations, example multicomponent aluminum alloys do not have any added scandium.

Example multicomponent aluminum alloys can include nickel, erbium, zirconium, yttrium, and ytterbium in amounts and ranges disclosed above as well as a balance of weight percent aluminum. In various implementations, example multicomponent aluminum alloys include 1 wt % to 4 wt % Ni; 0.6 wt % to 1.6 wt % Er; 0.1 wt % to 1.2 wt % Zr; 0.05 wt % to 0.3 wt % Y; 0.1 wt % to 1.2 wt % Yb, and the balance aluminum. In various implementations, example multicomponent aluminum alloys include 2 wt % to 3 wt % Ni; 1.0 wt % to 1.4 wt % Er; 0.5 wt % to 1.2 wt % Zr; 0.10 wt % to 0.3 wt % Y; and 0.5 wt % to 1.0 wt % Yb, and the balance aluminum. Other ranges and amounts are contemplated.

Incidental elements and impurities in the disclosed multicomponent aluminum alloys may include, but are not limited to, silicon, iron, elements adhering to raw material stock, or mixtures thereof. Incidental elements and impurities may be present in the alloys disclosed herein in amounts totaling no more than 0.5 wt %, no more than 0.4 wt %, no more than 0.3 wt %, no more than 0.2 wt %, no more than 0.1 wt %, no more than 0.05 wt %, no more than 0.01 wt %, or no more than 0.001 wt %.

It is understood that the alloys described herein may consist only of the above-mentioned constituents, may consist essentially of such constituents, or, in other embodiments, may include additional constituents.

B. Example Phase and Nanostructure Characteristics

Multicomponent aluminum alloys disclosed and contemplated herein have various phase and nanostructure characteristics. For instance, example multicomponent aluminum alloys can include a stable $Al_3Ni$ eutectic phase. Grain structures within example multicomponent aluminum alloys can be maintained using a grain pinning dispersion combined with an oxygen gettering phase. These grain structures can aid in maintaining fine grain sizes through building and optional post-build thermal treatments.

Example multicomponent aluminum alloys can include $L1_2$ precipitation phase in addition to the $Al_3Ni$ eutectic phase. Generally speaking, an $L1_2$ precipitation phase is a high-temperature stable phase that can be retained into solution during the rapid solidification found during additive manufacturing, such as during DMLS processing. $L1_2$ precipitation phases can directly precipitate during post-build stress relief without requiring solutionizing and/or quenching processes typically used during forged alloy manufacturing. Broadly, $L1_2$ precipitation phases can improve the processability of atomized alloy powders used during additive manufacturing. Additionally, $L1_2$ precipitation phases can provide added strength to a manufactured article.

In some instances, multicomponent aluminum alloys disclosed and contemplated herein can include $L1_2$ precipitation phases with one or more design properties. In some implementations, example multicomponent aluminum alloys include a $L1_2$ precipitation phase that is stable over competing phases. In some implementations, example multicomponent aluminum alloys have reduced, or minimized, lattice misfit between an $L1_2$ precipitation phase and a face centered cubic (FCC) matrix. Minimizing lattice misfit can maximize thermal stability. In some implementations, example multicomponent aluminum alloys have minimized an $L1_2$ precipitation phase coarsening rate. Minimizing the coarsening rate can result in a fine dispersion of the $L1_2$ precipitation phase in additively manufactured articles. Minimizing the coarsening rate can also enable direct aging during post-build stress relief processes, such as aging at a temperature of from 300° C. to 425° C.

Example multicomponent aluminum alloys disclosed and contemplated herein have a $L1_2$ precipitation phase fraction of, by volume fraction or atomic fraction, from 0.5% to 6%. In some instances, $L1_2$ precipitation phase fraction can be from 0.5% to 6% at 350° C.; from 1% to 3% at 350° C.; from 1.5% to 2.5% at 350° C.; or from 2.5% to 4.5% at 350° C.

Example $L1_2$ precipitation phases found in multicomponent aluminum alloys disclosed and contemplated herein have an $Al_3X$ structure, where X is at least one of: erbium, zirconium, yttrium, and ytterbium. Generally speaking, the $Al_3X$ composition has sluggish kinetics, which provides a potential for precipitate strengthening without requiring solution and quenching treatments. The $Al_3X$ composition has low solubility in aluminum, high temperature stability and coarsening resistance, and low lattice misfit with the aluminum matrix.

Without being bound by a particular theory, Zr can be used in example multicomponent aluminum alloys to stabilize the multicomponent $Al_3X$ $L1_2$ phase for precipitate strengthening and grain inoculation. Without being bound by a particular theory, erbium and/or ytterbium can stabilize the $L1_2$ phase crystal structure, which improves precipitate strengthening response.

C. Example Physical Characteristics

Example multicomponent aluminum alloys disclosed and contemplated herein can have one or more desirable physical properties. For instance, example multicomponent aluminum alloys may have hot tear resistance during an additive manufacturing process and resulting alloys may have high strength. The following section describes certain physical characteristics of example multicomponent aluminum alloys, including ultimate tensile strength, yield strength, fatigue test performance, hardness, and fracture toughness.

Generally, ultimate tensile strength is the maximum stress that a material can withstand while experiencing tensile elongation. Tensile strength testing conducted on example multicomponent aluminum alloys was performed at room temperature in accordance with ASTM E8. Tensile strength testing conducted on example multicomponent aluminum alloys was performed at elevated temperatures in accordance with ASTM E21.

Figure 2:
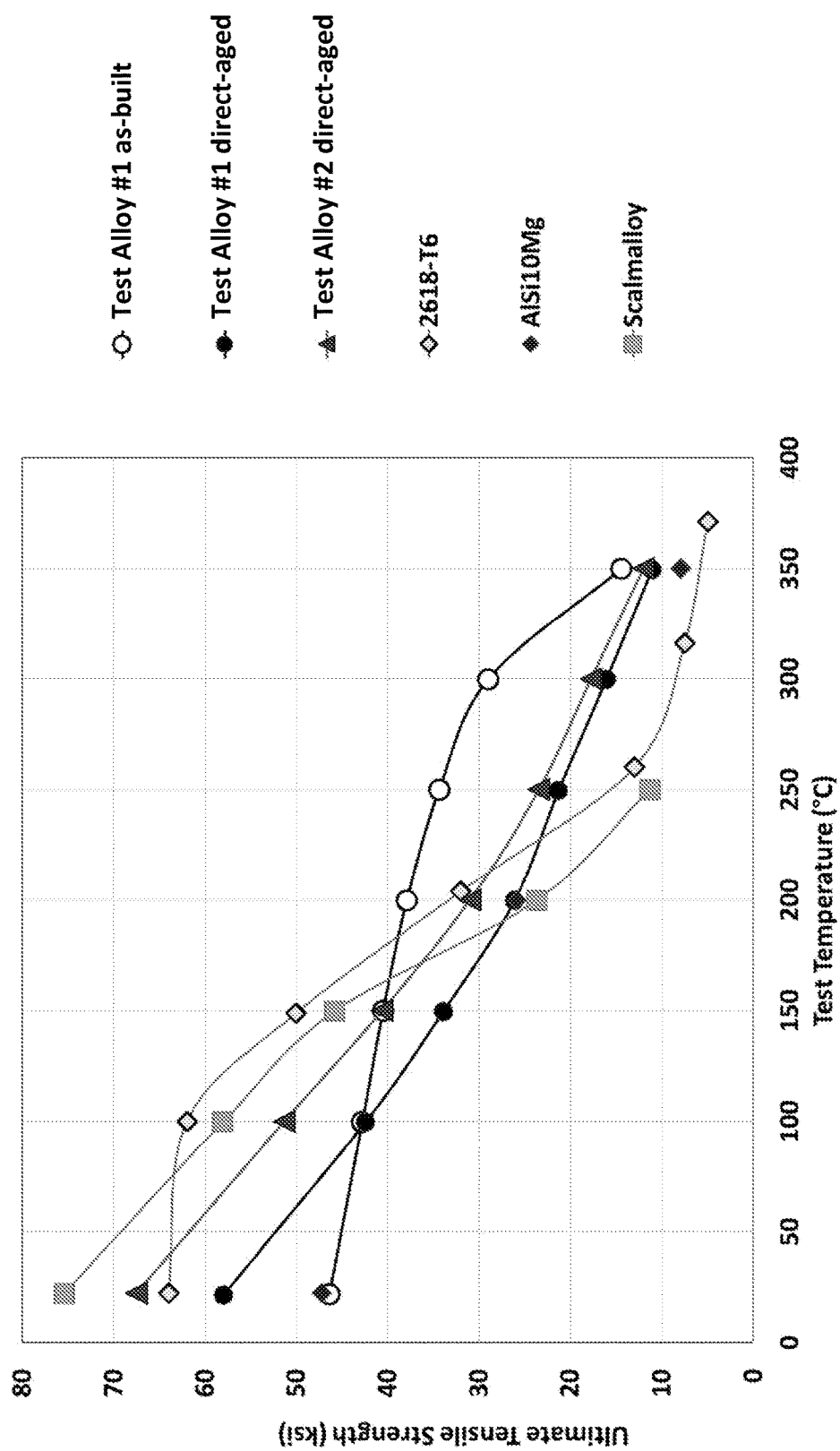
FIG. 2 shows experimental ultimate tensile strength test data for example multicomponent alloys compared to existing alloys.

As an example, a multicomponent aluminum alloy, after being subjected to an additive manufacturing process and after aging at 300° C. to 425° C., has an ultimate tensile strength of at least 55 ksi at 22° C. As another example, a multicomponent aluminum alloy, after subjecting the alloy to an additive manufacturing process and after aging at 375° C. to 425° C. to produce an aged alloy, the aged alloy has an ultimate tensile strength of at least 20 ksi at 250° C. As another example, after subjecting an example atomized alloy powder to an additive manufacturing process to generate an alloy product, the alloy product has an ultimate tensile strength of at least 25 ksi at 300° C. Other example values are shown in FIG. 2, described in greater detail below.

As used herein, the terms "ambient temperature" or "room temperature" refer to the temperature of the external environment at the location at which the system and/or the process of the present disclosure is operated. As an example, in certain environments, ambient temperature or room temperature is approximately 22° C.

Yield strength can be determined by evaluation of data obtained during tensile strength testing. Generally, yield strength relates to a yield point of a material during tensile strength testing; beyond the yield strength point deformations to the material are not recoverable upon removal of the load. Put another way, yield strength is the stress level at which plastic deformation begins. As an example, a multicomponent aluminum alloy, after being subjected to an additive manufacturing process, has a yield strength of at least 30 ksi at 250° C.

Generally, stress corrosion tests evaluate a material's performance when under tensile stress in a corrosive environment. Stress corrosion tests were performed on example multicomponent aluminum alloys in accordance with ASTM G47 and ASTM G49. Experimental performance of example multicomponent alloys when subjected to stress corrosion tests are described below in section II.D.

Generally, fatigue testing can evaluate a material's ability to resist fatigue when subjected to direct stress for a relatively large number of cycles. Fatigue testing for constant force was performed in accordance with ASTM E466. As an example, a multicomponent alloy, after being subjected to an additive manufacturing process and after aging at 300° C. to 425° C., is capable of passing a fatigue test without failure, the fatigue test including a stress amplitude of 15 ksi, a frequency of 50 Hz, a R ratio of −1, and a number of cycles being 10,000,000.

Generally, fracture toughness, $K_{Ic}$ is a characterization of a material's resistance to fracture in the presence of a sharp crack under stress and tensile constraint. Fracture toughness testing was performed in accordance with ASTM E399.

The hardness may be measured according to ASTM E384. In some implementations, example multicomponent aluminum alloys have a hardness of at least 120 HV after aging the alloy at a temperature of 350° C. for 24 hours. In some implementations, example multicomponent aluminum alloys have a hardness of at least 125 HV after aging the alloy at a temperature of 400° C. for 2 hours. In some implementations, example multicomponent aluminum alloys have a hardness of at least 130 HV.

D. Example Methods of Manufacture

Example multicomponent aluminum alloys disclosed and contemplated herein can be fabricated into various input stock forms relevant to the additive manufacturing system of interest. For instance, example multicomponent aluminum alloys disclosed and contemplated herein can be manufactured into atomized alloy powder using available atomization techniques such as inert gas atomization. Resulting atomized alloy powders can be used in powder-bed fusion and directed energy deposition systems.

An example method of manufacturing an atomized alloy powder includes melting elemental metal feedstock or pre-alloyed feedstock such that a desired chemistry is produced. In some combinations of elements disclosed above, when a desired chemistry reaches temperatures at or above temperatures where there is no solid material fraction in the melt, atomization processes should take place.

Typically, the melt is a homogenous distribution of the feedstock elements. Example components in the feedstock are described herein, and include, for instance, nickel, erbium, zirconium, yttrium, ytterbium, and aluminum, in amounts disclosed and contemplated herein. Additional components in the feedstock are contemplated, such as incidental elements and impurities.

Then the melt is passed through a nozzle and immediately exposed to high velocity inert gas, such as argon. The high velocity inert gas breaks up the molten stream and produces spherical powders. The spherical powders then cool and fall into an atomizing tower. This example method can produce spherical powder with desirable flow characteristics and high chemical purity.

Example atomized alloy powders can have particles sized for a particular use and/or fabrication system. In some implementations, example atomized alloy powders include particles having diameters of from 20 μm to 63 μm.

Example multicomponent aluminum alloys disclosed and contemplated herein can also be fabricated into wire form via conventional ingot metallurgy and wire drawing techniques for use in wire-based additive manufacturing systems.

E. Example Methods of Additive Manufacturing

Example multicomponent aluminum alloys disclosed and contemplated herein can be used in additive manufacturing systems. Additive manufacturing is a process by which parts are built in a layered fashion by selectively fusing metal using a computer-controlled energy source (e.g., laser, electron beam, weld torch, or the like). Additive manufacturing is also defined in ASTM F2792-12a entitled "Standard Terminology for Additively Manufacturing Technologies."

Example additive layer manufacturing processes include: selective laser sintering in which a laser is used to sinter a powder media in precisely controlled locations; laser wire deposition in which a wire feedstock is melted by a laser and then deposited and solidified in precise locations to build the product; electron beam melting; laser engineered net shaping; and direct metal deposition. In general, additive manufacturing techniques provide flexibility in free-form fabrication without geometric constraints, fast material processing time, and innovative joining techniques. Suitable additive manufacturing systems include the EOSINT M 280 Direct Metal Laser Sintering (DMLS) additive manufacturing system, available from EOS GmbH (Robert-Stirling-Ring 1, 82152 Krailling/Munich, Germany).

In some implementations, direct metal laser sintering (DMLS) is used to produce articles comprising the disclosed and contemplated example multicomponent aluminum alloys. During example processes, an atomized alloy powder may be spread in a bed and a laser is used to selectively melt and fuse regions of the bed. Articles of manufacture can be built in a layer-by-layer fashion by continually spreading and fusing layers of powder.

In implementations utilizing DMLS, laser settings can be selected to, for a manufactured article, minimize porosity, maximize elongation and reduction in area (RA %), and provide proper strength characteristics. Example DMLS laser parameters in one possible implementation include: laser power of 370 W, scan speed of 1300 mm/s, scan spacing 0.17 mm, and layer depth 30 μm.

Various post-processing operations can be performed after the build process. In some instances, post-processing operations improve one or more characteristics of the "as-built" article of manufacture. In some instances, following the build process, certain articles may contain defects that preclude use "as-built." For example, certain articles may include unacceptable porosity, chemical inhomogeneity, or anisotropy. Post-processing operations can eliminate or minimize such defects.

Post-processing operations can include various heat treatments. The manufactured article can be directly transferred from the additive manufacturing system to a heated enclosure, such as a furnace, without first requiring solutionizing (also referred to as solution heat treating) the article. These heat treatments applied to the manufactured article are referred to herein as "aging" processes. In some implementations of a heat treatment, the heated enclosure may be pressurized to perform hot isostatic pressing of the material to reduce porosity.

Post-processing thermal treatment may relieve stress and/or strengthen one or more portions of the aluminum alloy article. For example, thermal treatments may result in precipitation hardening of one or more portions of the aluminum alloy part. Aging can include placing an as-built article in a heated environment at a temperature for a given period of time. In some instances, aging can be conducted at two distinct temperatures for two distinct times.

For example, post processing heat treatment can occur at a temperature of from 300° C. to 425° C. In some implementations, heat treatment can occur at a temperature of from 325° to 400° C.; from 350° C. to 375° C.; from 300° C. to 400° C.; from 325° C. to 425° C.; from 300° C. to 350° C.; from 350° C. to 425° C.; and from 375° C. to 425° C. In some implementations, heat treatment can occur at a temperature of from 175° C. to 250° C. for 1 hour to 4 hours. As examples, and without limitation, heat treatment can occur at 200° C. for 1 hour, 375° C. for 2 hours, and 400° C. for 2 hours.

FIG. 1 shows an example method 100 of using an atomized alloy powder in additive manufacturing. Example method 100 begins by receiving an atomized alloy powder (operation 102). The atomized alloy powder can be example atomized alloy powders disclosed and contemplated herein. In some implementations, the atomized alloy powder includes alloy particles comprising, by weight percentage: 1% to 4.2% nickel; 0.5% to 2.6% erbium; 0.1% to 1.5% zirconium; 0.05% to 0.3% yttrium; 0.1% to 1.2% ytterbium; and the balance of atomic percent comprising aluminum and incidental elements and impurities. The alloy particles can include $L1_2$ precipitates having an $Al_3X$ structure, where X is at least one of: erbium, zirconium, yttrium, and ytterbium.

Next, additive manufacturing is conducted (operation 104) with the atomized alloy powder. Conducting additive manufacturing (operation 104) includes operating an additive manufacturing system in such a way as to produce a desired manufactured article. Example apparatus and laser parameters are discussed above, although different apparatus and modifications to those parameters are contemplated and within the scope of this disclosure. Aluminum alloys in the manufactured article can solidify with about 10% of non-equilibrium (soluble) eutectic constituents for improved resistance to hot tearing during additive manufacturing.

After conducting additive manufacturing (operation 104), heat treatment (operation 106) is conducted. Heat treatment (operation 106) can include post-processing aging operations as disclosed and contemplated herein. Generally, heat treatment (operation 106) includes positioning the manufactured article in a heated container, such as a furnace, for a predetermined period of time at one or more temperatures. This process is also referred to herein as an aging process. During heat treatment (operation 106), eutectic constituents can be dissolved to restore a single-phase aluminum matrix, which can be free of coarse eutectic constituents that provided hot tearing resistance.

Upon completion of heat treatment, the manufactured article is removed from the heated container and cooled. Cooling can include positioning the manufactured article in an uncirculated air environment at room temperature.

F. Example Articles of Manufacture

The disclosed aluminum alloys can be used to manufacture a variety of articles. Exemplary articles include, but are not limited to, gearbox housings (e.g., helicopter gearbox housing) and aerospace structural components.

II. Experimental Examples

Experimental examples of multicomponent aluminum alloys disclosed and contemplated herein were made and tested. In some instances, the experimental examples of atomized alloy powders were made and used in additive manufacturing processes. Articles produced using the atomized alloy powders in additive manufacturing were, in some instances, compared with existing commercial alloys.

A. Experimental Compositions

Experimental multicomponent aluminum alloys were designed using proprietary software to QuesTek. These experimental alloys and their elemental components are detailed in Table 1 below.

TABLE 1

Experimental multicomponent alloys, where components are listed in weight percentage (wt %).

| Element | Test Alloy #1 (wt %) | Test Alloy #2 (wt %) |
|---|---|---|
| Ni | 2.14 | 4.16 |
| Er | 1.35 | 1.14 |
| Zr | 1.15 | 1.19 |
| Y | 0.25 | — |
| Yb | 0.73 | — |
| Al | Balance | Balance |
| Total Other | <0.5 | <0.2 |

Test alloy #1 and test alloy #2 were manufactured into atomized alloy powders designed for additive manufacturing operations. Atomized alloy powders including particles comprising test alloy #1 and test alloy #2 were manufactured into articles for experimental testing. Two versions of articles manufactured with test alloy #1 atomized powder were evaluated: an "as-built" article that had not been aged and a "direct aged" article that was aged for 2 hours at 400° C. One version of an article manufactured with test alloy #2 was evaluated: an article that was aged for 1 hour at 200° C. and for 2 hours at 375° C.

In various experimental tests below, test alloy #1 articles and test alloy #2 article were compared to commercially-available alloys. Specifically, articles manufactured with 2618-T6, A356, AlSi10 Mg, and Scalmalloy were evaluated. Alloy 2618-T6 is a wrought alloy that has been solution heat treated and then artificially aged. Alloy A356 is a casting alloy. Alloy AlSi10 Mg is an additive manufacturing alloy. Scalmalloy is an additive manufacturing alloy with Scandium (Sc). Alloy AlSi10 Mg was the only commercially-available alloy experimentally evaluated. Experimental data for 2618-T6, A356, and Scalmalloy were obtained from publicly available sources, such as literature, handbooks, or datasheets. Components of each are detailed in Table 2 below.

TABLE 2

Commercial alloys, where components are listed in weight percentage (wt %).

| Element | 2618 (wt %) | A356 (wt %) | Scalmalloy | AlSi10Mg |
|---|---|---|---|---|
| Copper, Cu | 1.9-2.7 | 0-0.25 | 0-0.10 | ≤0.05 |
| Magnesium, Mg | 1.3-1.8 | 0.25-0.45 | 4-4.9 | 0.2-0.45 |
| Iron, Fe | 0.9-1.3 | 0-0.60 | 0-0.4 | ≤0.55 |
| Nickel, Ni | 0.9-1.2 | | | |
| Silicon, Si | 0.1-0.25 | 6.5-7.5 | 0-0.4 | 9.0-11.0 |
| Titanium, Ti | 0.04-0.10 | 0-0.25 | 0-0.15 | ≤0.15 |
| Zinc, Zn | 0-0.10 | 0-0.35 | 0-0.25 | ≤0.10 |
| Manganese, Mn | | 0-0.35 | 0.3-0.8 | ≤0.45 |
| Scandium, Sc | | | 0.6-0.8 | |
| Zirconium, Zr | | | 0.2-0.5 | |
| Oxygen, O | | | 0-0.05 | |
| Vanadium, V | | | 0-0.05 | |
| Aluminum, Al | Balance | Balance | Balance | Balance |

B. Experimental Tensile Strength and Yield Strength Testing

Articles manufactured with test alloy #1 (both as-built and direct aged), test alloy #2, and alloy AlSi10 Mg were subjected to tensile strength testing. Tensile strength testing conducted on example multicomponent aluminum alloys was performed at room temperature in accordance with ASTM E8. Tensile strength testing conducted on example multicomponent aluminum alloys was performed at elevated temperatures in accordance with ASTM E21.

FIG. 2 shows ultimate tensile strength (in ksi) for articles manufactured with each of the alloys listed above at test temperatures of: 22° C., 100° C., 150° C., 200° C., 250° C., 300° C., and 350° C. As shown in FIG. 2, particularly as the test temperature increases above 150° C., test alloy #1 (both as-built and direct-aged) and test alloy #2 retain their strength properties better than the commercial alloys.

Figure 3:
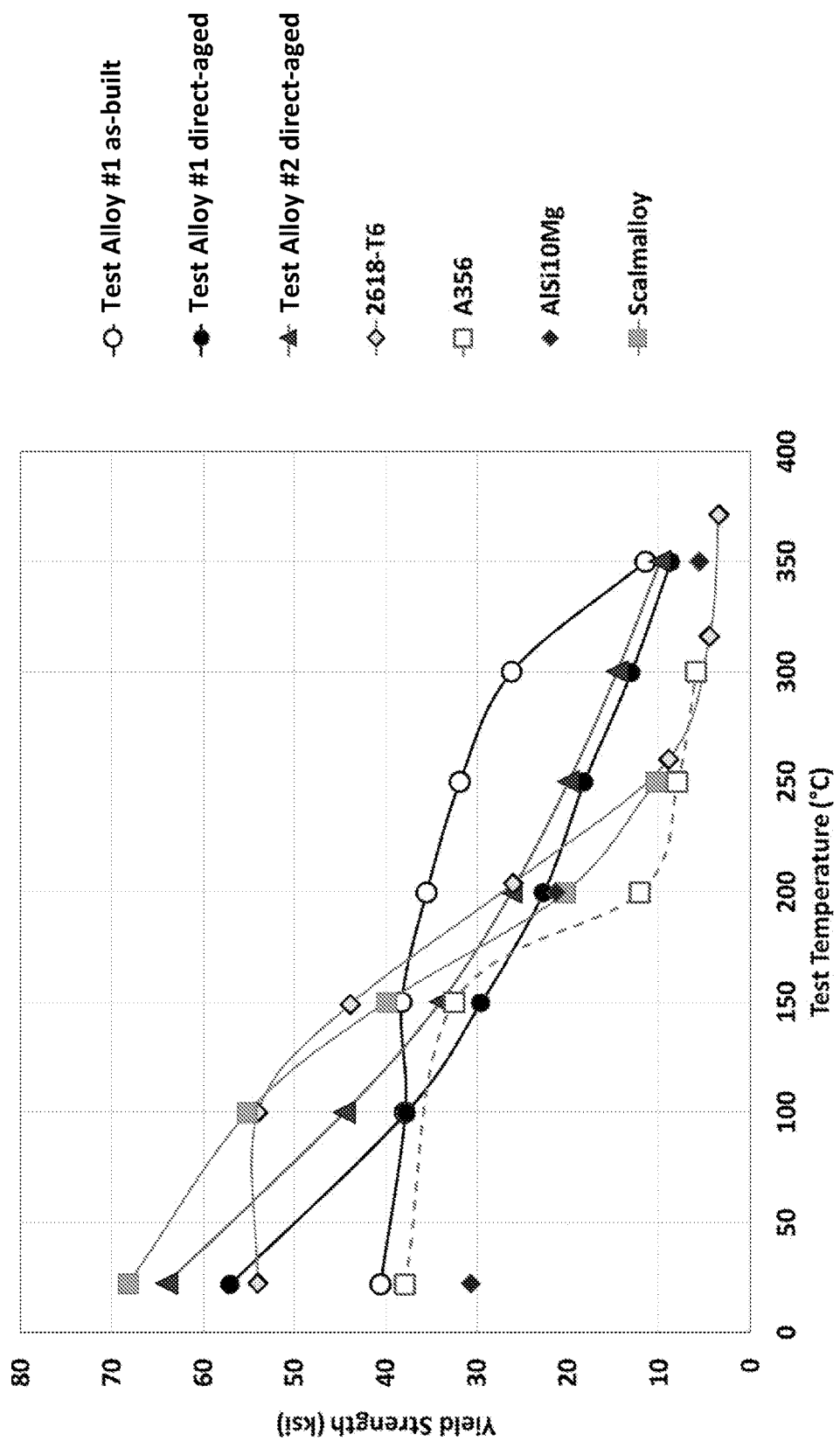
FIG. 3 shows experimental yield strength test data for example multicomponent alloys compared to existing alloys.

The tensile strength test results were evaluated for yield strength. FIG. 3 shows yield strength (in ksi) of articles manufactured with the various alloys at test temperatures of: 22° C., 100° C., 150° C., 200° C., 250° C., 300° C., and 350° C. As shown in FIG. 3, particularly as the test temperature increases above 150° C., test alloy #1 (both as-built and direct-aged) and test alloy #2 retain their strength properties better than the commercial alloys.

Figure 4:
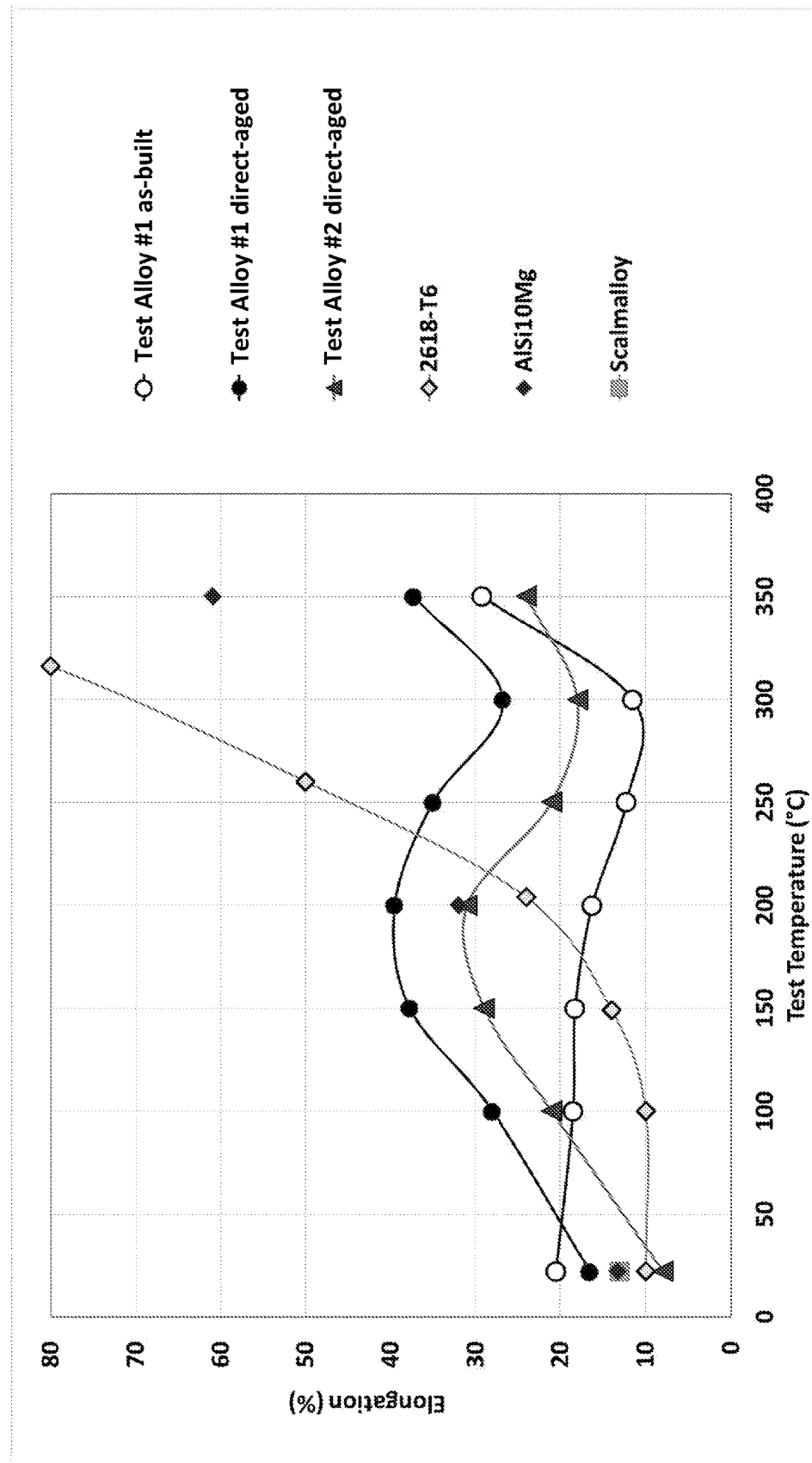
FIG. 4 shows experimental elongation test data for example multicomponent alloys compared to existing alloys.

The tensile strength test results were also evaluated for elongation. FIG. 4 shows elongation (in %) of articles manufactured with the various alloys at test temperatures of: 22° C., 100° C., 150° C., 200° C., 250° C., 300° C., and 350° C. The elongation of test alloy #1 exceeds all other alloys at a 22° C. test temperature. Test alloys #1 and #2 have elongations that exceed commercial alloys at elevated temperatures of practical application (e.g. 150-200° C.). Although 2618 and AlSi10 Mg have significant elongations above 250° C., their strength levels decline below test alloys #1 and #2 above this temperature.

C. Experimental Fatigue Testing

Articles manufactured with test alloy #1 were direct aged and subjected to fatigue testing. Specifically, fatigue testing for constant force tests were performed in accordance with ASTM E466. Four sample articles were evaluated where the R ratio was −1, stress amplitude was 15 ksi, and frequency was 50 Hz. Testing was discontinued for each of the four sample articles after 10,000,000 cycles. Put another way, all four samples did not fail at the maximum number of cycles. Each sample article exhibited an endurance limit of at least 15 ksi.

D. Experimental Stress Corrosion Testing

Articles manufactured with test alloy #1 (both as-built and direct aged) were subjected stress corrosion testing per ASTM G47 and ASTM G49. Samples of the as-built and direct aged articles were tested in triplicate. The samples were tested at 75% UTS for 10 days using a 3.5% NaCl alternate immersion method. Each of the samples, both the as-built and direct aged articles, completed the 10 day test period and were rated "light-moderate" for pitting. Put another way, the samples exhibited light to moderate pitting under stress corrosion testing conditions.

E. Experimental Stress Relaxation Testing

Figure 5:
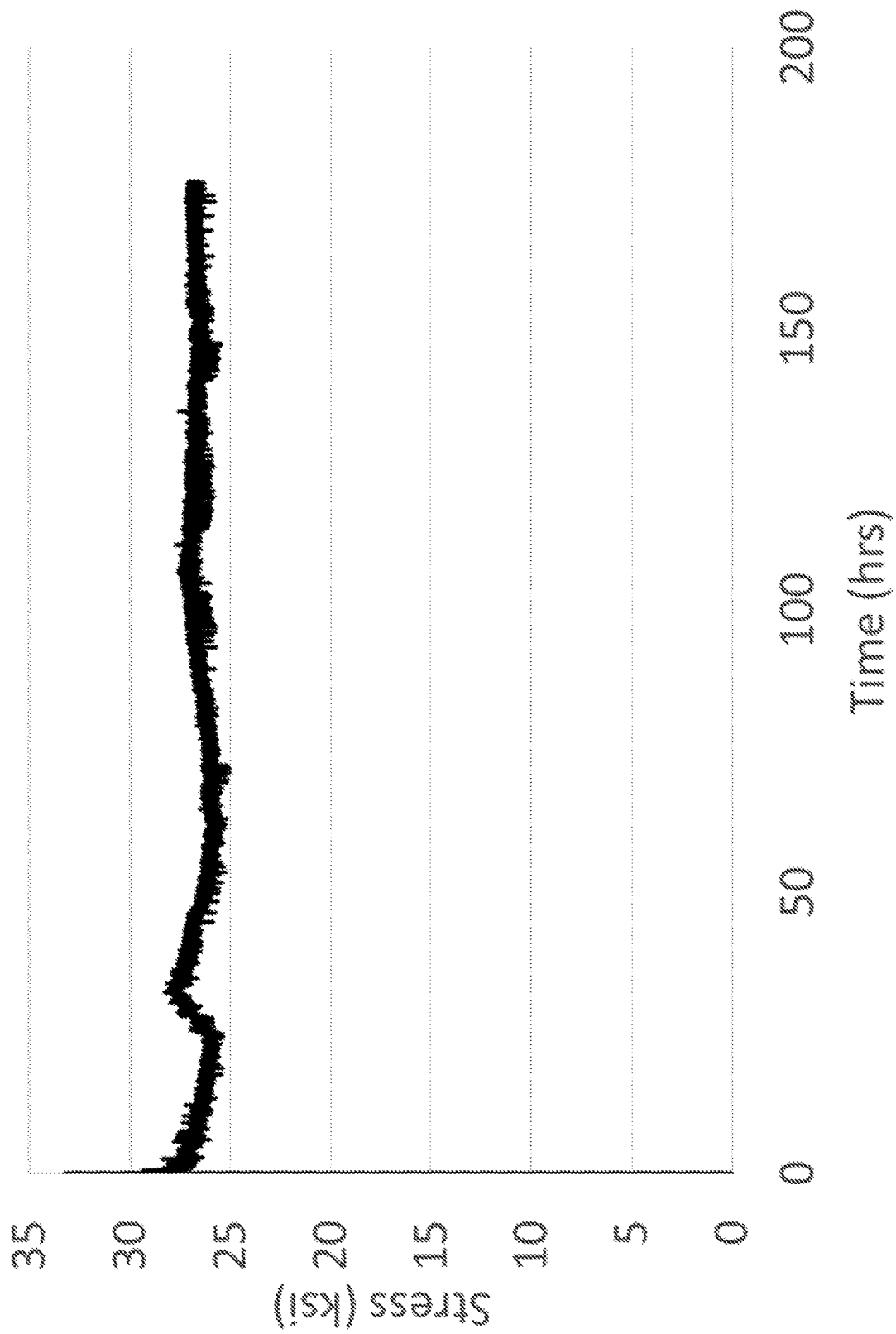
FIG. 5 shows experimental stress relaxation test data for an example multicomponent alloy.

An article manufactured with test alloy #1, in as-built condition, was heated to 232° C. and pulled to its yield stress (approximately 33 ksi) and strain (approximately 0.55%). The strain was then held constant at approximately 0.55% out for 176 hours. During this time, the stress remained at or above 25 ksi. FIG. 5 shows a plot of stress (in ksi) versus time for the sample during the test. The sample did not fail and was unloaded after the test. These test results indicate that test alloy #1 in as-built condition is thermo-mechanically stable under these loading conditions.

F. Experimental Evaluation of L1$_2$ Phase—Atom Probe

An article manufactured with test alloy #2, aged for 8 hours at 400° C., was evaluated using atom probe tomography. Generally, during atom probe tomography, a sample is prepared by electropolishing, or with a focused ion beam, to create a tip with a radius on the order of tens of nanometers. This tip has a voltage passed through it and is pulsed with a laser to evaporate layers of atoms at a time, which pass through a detector that measures their mass to charge ratio, and records their position with respect to the current voltage and experiment time. Atom probe tomography produces a three-dimensional atom-by-atom elementally and isotopically resolved image with sub-nanometer spatial resolution and a sampling volume typically 100 nm by 100 nm by 100 nm.

Figure 6C:
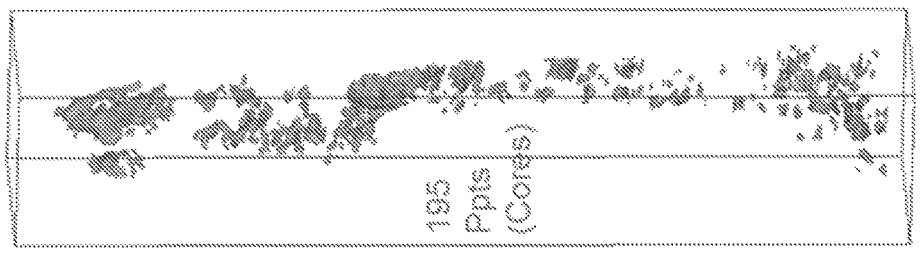
FIGS. 6A, 6B, and 6C show visualizations of isosurfaces of an example multicomponent alloy obtained using atom probe tomography.
Figure 6B:
Figure 6A:
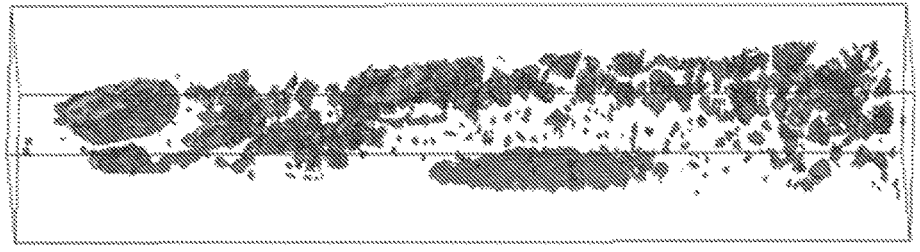
Figure 7:
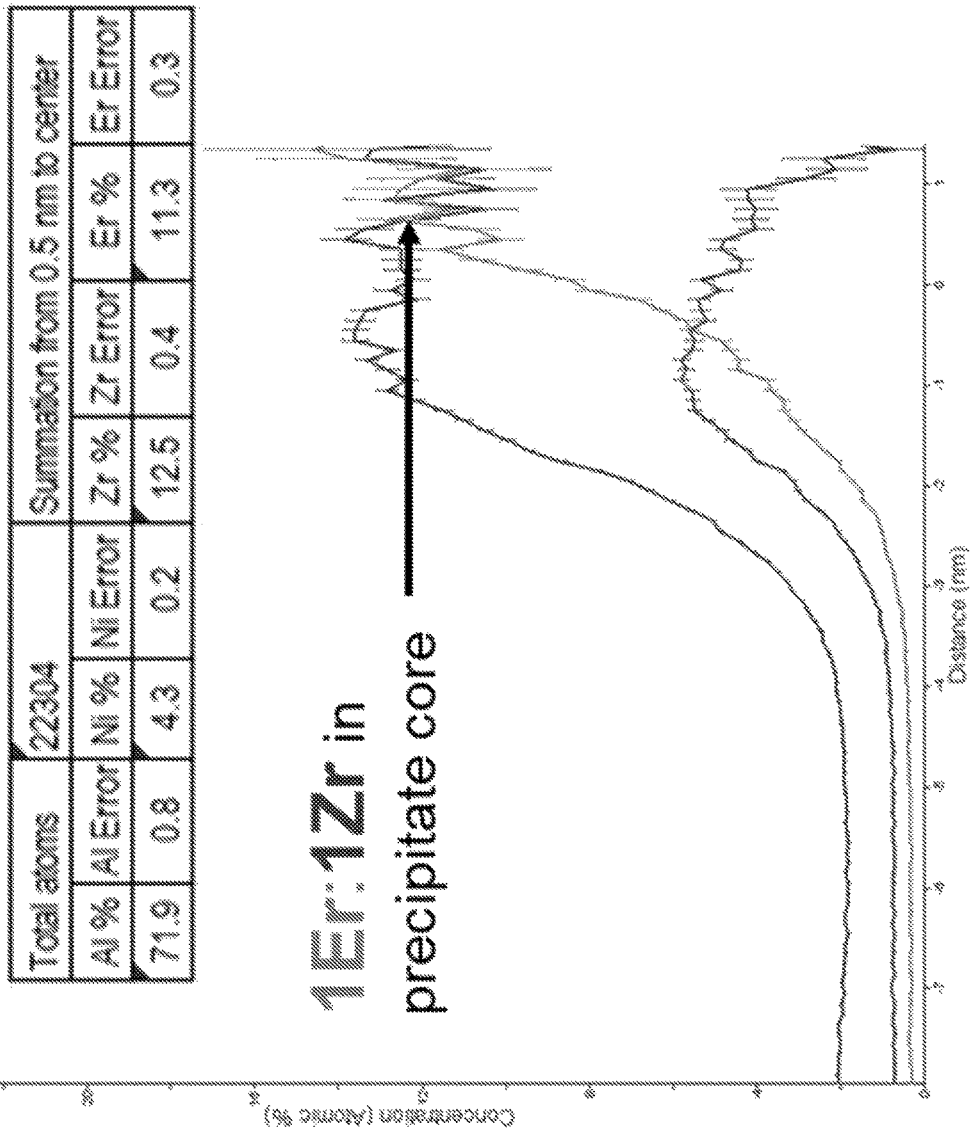
FIG. 7 shows compositional analysis for the data shown in FIGS. 6A, 6B, and 6C.

FIG. 6A, FIG. 6B, and FIG. 6C show visualizations of the isosurfaces. FIG. 6A highlights 9 percent (atomic percent, "at %") nickel, 12 at % Zr, and 5 at % Er. FIG. 6B shows the zirconium fraction and FIG. 6C shows the erbium fraction. FIG. 7 shows a compositional analysis for the 5 at % Er isosurfaces, excluding 6 isosurfaces with large surface areas.

Evaluating data obtained during the atom probe testing, FIGS. 6A-6C show very fine segregated regions with a ratio of 1:1 Er to Zr, and in the nominal proportion of Al$_3$X (where X=Er and Zr). These data confirm that the alloys have the L1$_2$ phase. Additionally, the experimental data show that the particles are on the nanoscale.

Figures 8A, 8B:
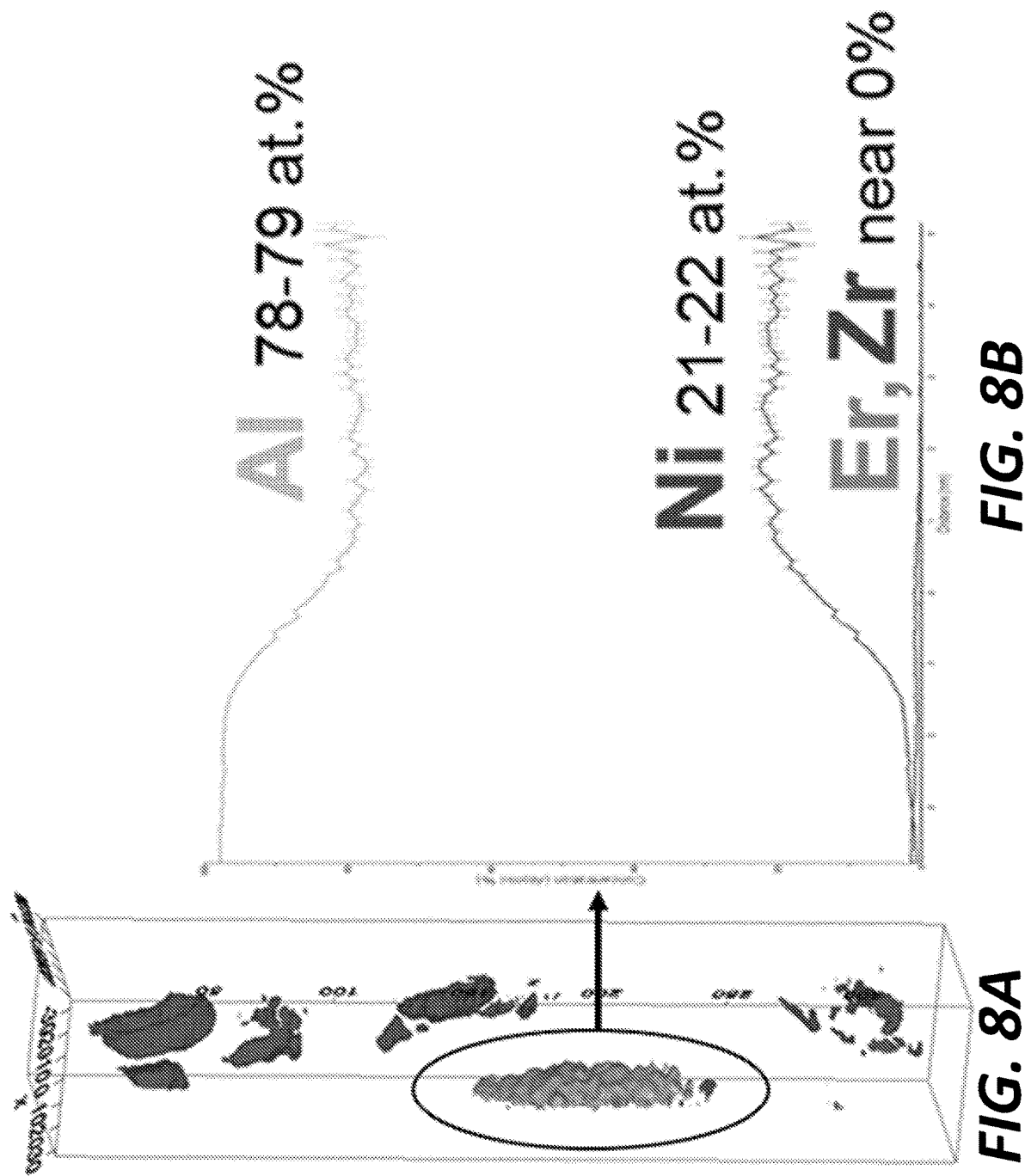
FIG. 8A shows another visualization of isosurfaces of the example multicomponent alloy shown in FIGS. 6A-6C.
FIG. 8B shows compositional analysis for the data shown in FIG. 8A.

FIG. 8A shows another isosurface, considering Al, Ni, Er, and Zr components, and highlighting the reconstruction of a near 3:1 atomic ratio particle at the edge of the sampling area. FIG. 8B shows a compositional analysis of the data shown in FIG. 8A. FIGS. 8A and 8B validate the existence of an Al$_3$Ni eutectic phase.

G. Experimental Evaluation of DMLS Laser Parameters

Two samples of nine different build conditions were printed with a DMLS additive manufacturing system. Each sample was tensile tested in as-built condition (i.e., no aging). Table 3 below shows various laser parameters and Tables 4 and 5 show test results for the nine build conditions. At 400° C., test alloy #1 achieved a hardness of at least 120 HV after 2 hours and maintained a hardness of at least 120 HV during the test and until the test ended at 24 hours.

TABLE 3

Laser parameters during DMLS additive manufacturing test runs.
Laser Parameters

| Sample | Laser Power (W) | Scan Speed (mm/s) | Scan Spacing (mm) |
|---|---|---|---|
| BC1 | 335 | 997 | 0.14 |
| BC2 | 335 | 1073.7 | 0.16 |
| BC3 | 335 | 1240.8 | 0.18 |
| BC4 | 335 | 1321.5 | 0.13 |
| BC5 | 370 | 1101.2 | 0.14 |
| BC6 | 370 | 1185.9 | 0.16 |
| BC7 | 370 | 1370.4 | 0.18 |
| BC8 | 370 | 1300 | 0.17 |
| BC9 | 370 | 2210.3 | 0.10 |

TABLE 4

Test results for each sample shown in Table 3.
Results

| Sample | Area fraction of porosity (%) | Average pore size (Feret diameter, microns) | Hardness (HV) | Hardness (HRB, converted from HV) | Room Temperature 0.2% Yield Strength (ksi) | Room Temperature Ultimate Tensile Strength (ksi) |
|---|---|---|---|---|---|---|
| BC1 | 0.84 | 38 | 110.2 | 54.9 | 45.1 | 50.1 |
| BC2 | 1.04 | 36 | 109.7 | 54.7 | 43.7 | 49.3 |
| BC3 | 0.41 | 32 | 108.9 | 54.1 | 42.8 | 48.6 |
| BC4 | 0.61 | 42 | 119.1 | 61.9 | 45.2 | 50.7 |
| BC5 | 0.62 | 34 | 111.9 | 56.5 | 44.2 | 49 |
| BC6 | 0.33 | 29 | 105.0 | 50.9 | 43.4 | 48.5 |
| BC7 | 0.22 | 25 | 108.4 | 53.8 | 42 | 48 |
| BC8 | 0.08 | 18 | 105.9 | 51.8 | 42.1 | 48 |
| BC9 | 2.14 | 40 | 114.4 | 58.0 | 42.5 | 48.9 |

TABLE 5

Additional test results for each sample shown in Table 3.

| Sample | Room Temperature % Elongation | Room Temperature % Reduction in Area | 232° C. 0.2% Yield Strength (ksi) | 232° C. Ultimate Tensile Strength (ksi) | 232° C. % Elongation | 232° C. % Reduction in Area |
|---|---|---|---|---|---|---|
| BC1 | 9 | 33 | 36.1 | 39.4 | 7 | 23 |
| BC2 | 10 | 34 | 36.8 | 40.1 | 7 | 31 |
| BC3 | 11 | 40 | 35.8 | 39.1 | 9 | 35 |
| BC4 | 10 | 30 | 37.4 | 41.3 | 9 | 34.5 |
| BC5 | 14 | 51 | 36.3 | 39.9 | 10 | 42 |
| BC6 | 15 | 57 | 36 | 39 | 11 | 48.5 |
| BC7 | 15 | 58 | 35.8 | 38.9 | 11 | 52.5 |
| BC8 | 16 | 62 | 35.7 | 38.9 | 11 | 52.5 |
| BC9 | 6 | 18 | 36.6 | 39.7 | 6 | 27.5 |

Based on these test data, it appears that example DMLS laser parameters are as follows: laser power=370 W, scan speed=1300 mm/s, scan spacing=0.17 mm, layer depth=30 microns. Selection of these parameters was based on minimized porosity, maximized elongation and reduction in area (RA %) and good strength levels.

H. Experimental Evaluation of Aging Response and Hardness

Figure 9A:
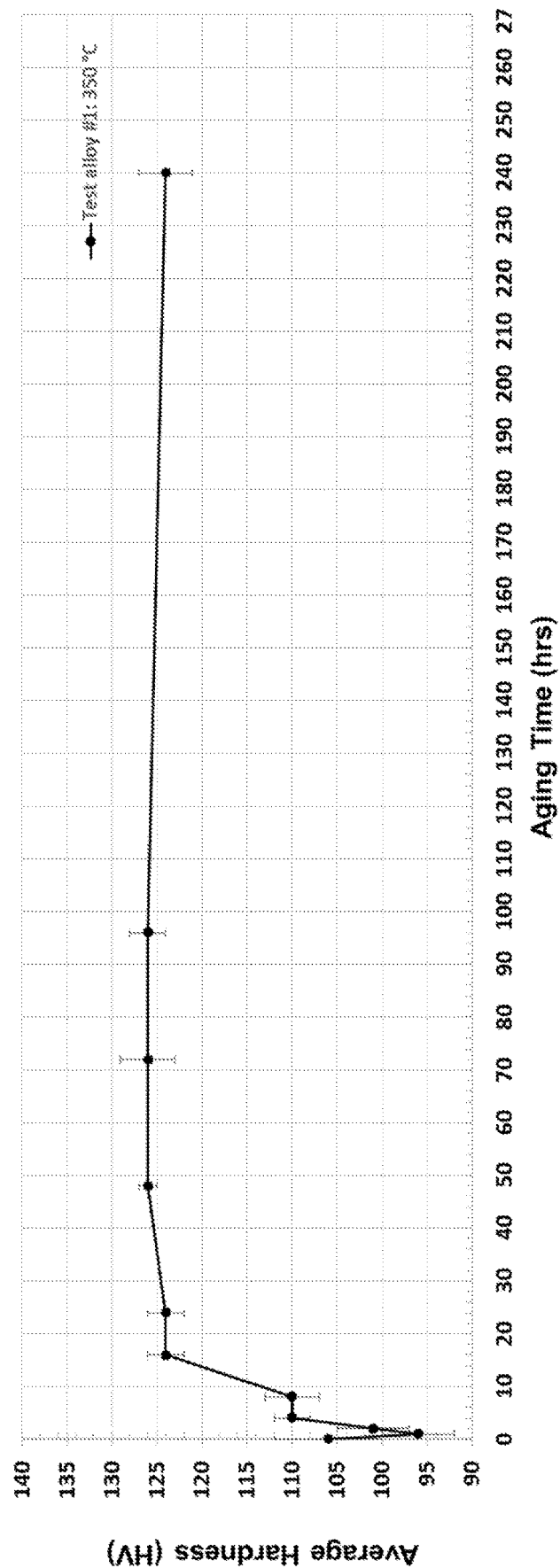
FIG. 9A shows experimental hardness test data for an example multicomponent alloy.
Figure 9B:
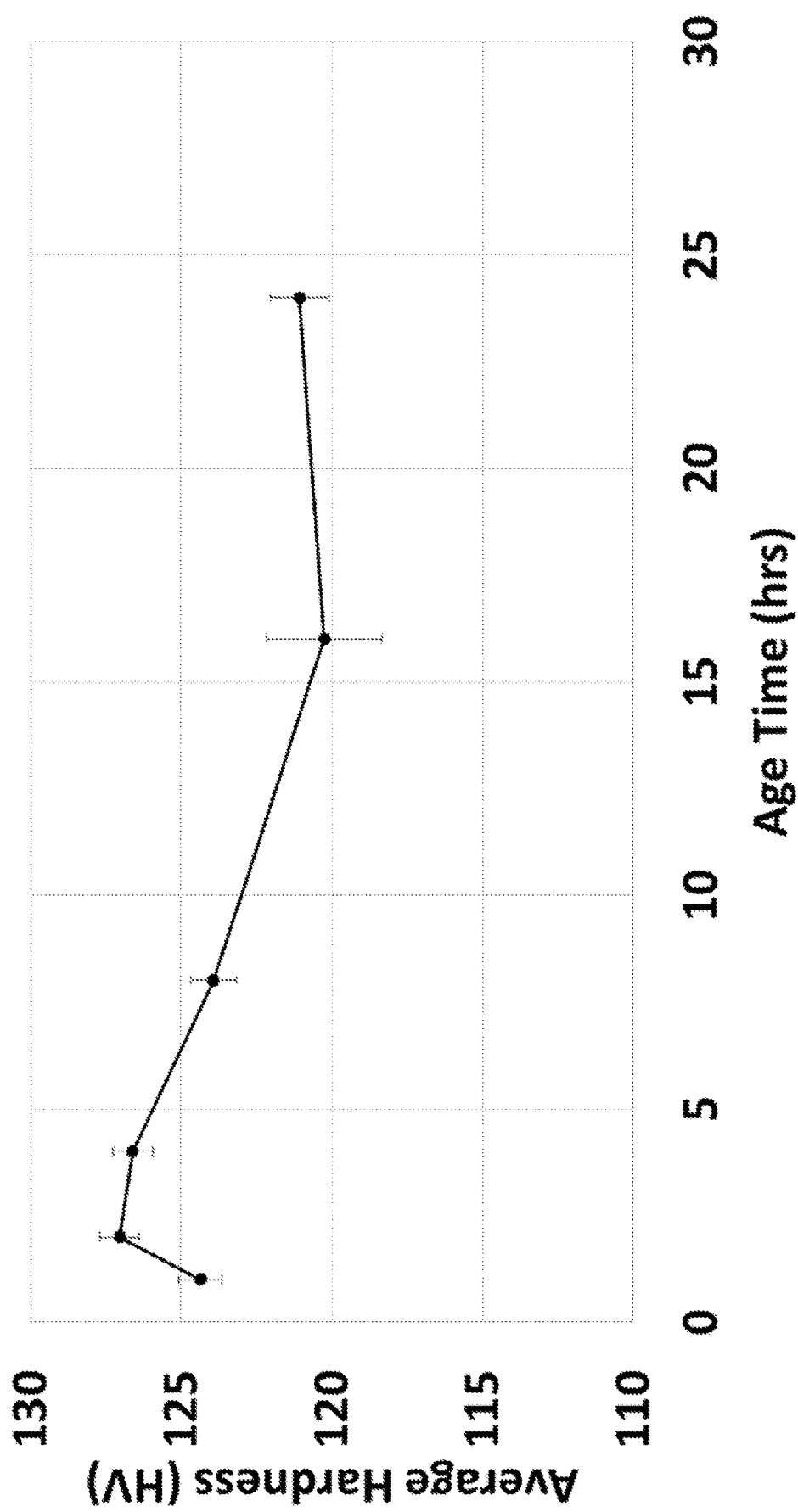
FIG. 9B shows experimental hardness test data for an example multicomponent alloy at a test temperature different from the data shown in FIG. 9A.

Articles manufactured with test alloy #1 were aged and their hardness measured during aging. FIG. 9A shows a plot of average hardness (HV) versus aging time in hours for test alloy #1 at 350° C. FIG. 9B shows a plot of average hardness (HV) versus aging time in hours for test alloy #1 at 400° C. Sample hardness was evaluated according to the Vickers hardness test. At 350° C., test alloy #1 achieved a hardness of at least 120 HV after 24 hours of aging, and retained its hardness to at least 240 hours of aging. At 400° C., test alloy #1 maintained a hardness of at least 120 HV during the test and until the test ended at 24 hours.

Figure 10A:
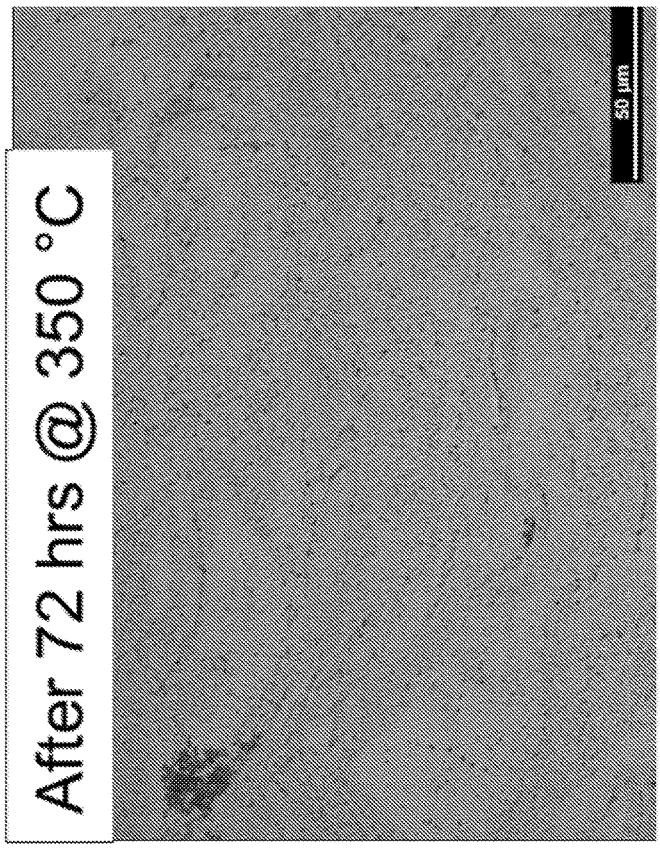
FIG. 10A is a micrograph of a surface of an example multicomponent alloy shown in FIGS. 9A and 9B in as-built condition.
Figure 10B:
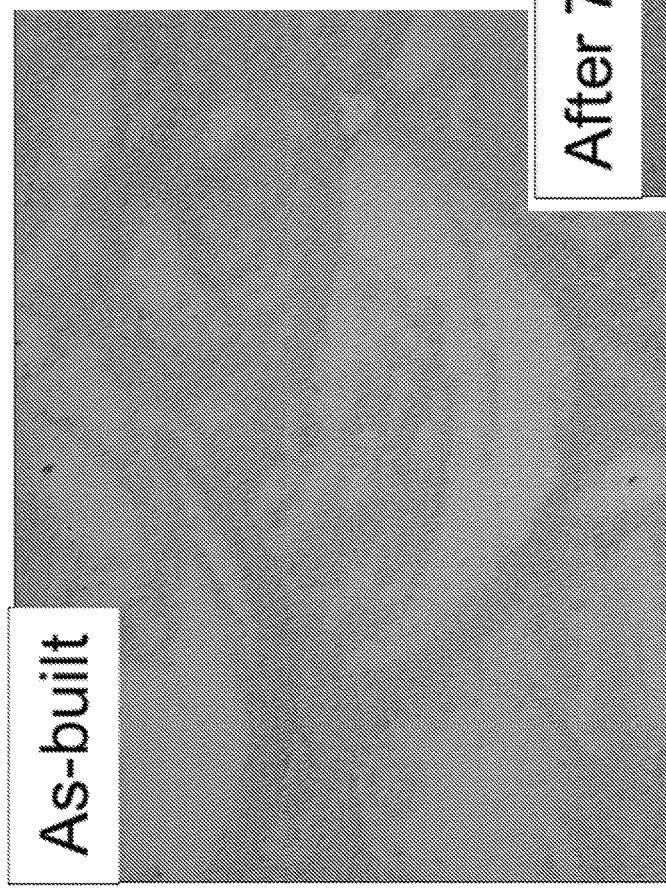
FIG. 10B is a micrograph of the surface of the example multicomponent alloy shown in FIG. 10A, after heating in an enclosed container and cooling.

FIG. 10A shows a micrograph image of an as-built article manufactured with test alloy #1. FIG. 10B shows the same article's surface after aging for 72 hours at 350° C. FIG. 10A and FIG. 10B have the same scale.

For the recitation of numeric ranges herein, each intervening number there between with the same degree of precision is explicitly contemplated. Each numeric range is inclusive of the end points. For example, for the range of 6-9, the numbers 7 and 8 are contemplated in addition to 6 and 9, and for the range 6.0-7.0, the number 6.0, 6.1, 6.2, 6.3, 6.4, 6.5, 6.6, 6.7, 6.8, 6.9, and 7.0 are explicitly contemplated.

It is understood that the foregoing detailed description and accompanying examples are merely illustrative and are not to be taken as limitations upon the scope of the disclosure. Various changes and modifications to the disclosed embodiments will be apparent to those skilled in the art. Such changes and modifications, including without limitation those relating to the chemical structures, substituents, derivatives, intermediates, syntheses, compositions, formulations, or methods of use, may be made without departing from the spirit and scope of the disclosure.

What is claimed is:

1. An alloy comprising, by weight percentage:
   1% to 4.2% nickel;
   0.5% to 2.6% erbium;
   0.1% to 1.5% zirconium;
   0.05% to 0.3% yttrium; and
   0.1% to 1.2% ytterbium; and
   the balance of weight percent comprising aluminum and incidental elements and impurities,
   wherein the alloy includes $L1_2$ precipitates having an $Al_3X$ composition, where X is at least one of: erbium, zirconium, yttrium, and ytterbium.

2. The alloy according to claim 1, wherein the alloy includes no more than 0.5% by weight percentage incidental elements and impurities.

3. The alloy according to claim 1, wherein the alloy does not include scandium.

4. The alloy according to claim 1, wherein the alloy, after being subjected to an additive manufacturing process and after aging at 300° C. to 425° C., has an ultimate tensile strength of at least 55 ksi at 22° C.

5. The alloy according to claim 1, wherein the alloy, after being subjected to an additive manufacturing process, has a yield strength of at least 30 ksi at 250° C.

6. The alloy according to claim 1, wherein the alloy has an $L1_2$ phase fraction that is 0.5% to 6% by volume fraction.

7. The alloy according to claim 1, wherein the alloy, after being subjected to an additive manufacturing process and after aging at 300° C. to 425° C., is capable of passing a fatigue test without failure, the fatigue test including a stress amplitude of 15 ksi, a frequency of 50 Hz, an r ratio of −1, and a number of cycles being 10,000,000.

8. The alloy according to claim 1, wherein after subjecting the alloy to an additive manufacturing process and after aging at 375° C. to 425° C. to produce an aged alloy, the aged alloy has an ultimate tensile strength of at least 20 ksi at 250° C.

9. The alloy according to claim 1, wherein after subjecting the alloy to an additive manufacturing process and after aging the alloy at a temperature of 350° C. for 24 hours to produce an aged alloy, the aged alloy has an average hardness of at least 120 HV.

10. The alloy according to claim 1, wherein the alloy comprises, by weight percentage:
    2% to 3% nickel;
    1.0% to 1.5% erbium;
    0.5% to 1.15% zirconium;
    0.10% to 0.25% yttrium; and
    0.5% to 0.8% ytterbium,
    the balance of weight percent comprising aluminum and no more than 0.5 weight percent incidental elements and impurities.

11. An atomized alloy powder usable in additive manufacturing, the atomized alloy powder comprising:

alloy particles comprising, by weight percentage:
- 1% to 4.2% nickel;
- 0.5% to 2.6% erbium;
- 0.1% to 1.5% zirconium;
- 0.05% to 0.3% yttrium;
- 0.1% to 1.2% ytterbium; and
- the balance of weight percent comprising aluminum and incidental elements and impurities,
- wherein the alloy particles include $L1_2$ precipitates having an $Al_3X$ composition, where X is at least one of: erbium, zirconium, yttrium, and ytterbium.

12. The atomized alloy powder according to claim 11, wherein the atomized alloy powder includes no more than 0.5% by weight percentage incidental elements and impurities; and
wherein the atomized alloy powder does not include scandium.

13. The atomized alloy powder according to claim 11, wherein after subjecting the atomized alloy powder to an additive manufacturing process and after aging at a temperature of 350° C. for 24 hours to produce an aged alloy product, the aged alloy product has an $L1_2$ phase fraction is 0.5% to 6% by volume fraction at 350° C.

14. The atomized alloy powder according to claim 11, wherein after subjecting the atomized alloy powder to an additive manufacturing process to generate an alloy product, the alloy product has ultimate tensile strength of at least 25 ksi at 300° C.

15. The atomized alloy powder according to claim 11, wherein after subjecting the atomized alloy powder to an additive manufacturing process and after aging at a temperature of 400° C. for 2 hours to produce an aged alloy product, the aged alloy product has an ultimate tensile strength of at least 55 ksi at ambient temperature.

16. The atomized alloy powder according to claim 11, wherein after subjecting the atomized alloy powder to an additive manufacturing process to generate an alloy product, the alloy product has a yield strength of at least 30 ksi at 250° C.

17. The atomized alloy powder according to claim 11, wherein after subjecting the alloy to an additive manufacturing process and after aging the alloy at a temperature of 350° C. for 24 hours to produce an aged alloy product, the aged alloy product has an average hardness of at least 120 HV.

18. A method of using an atomized alloy powder in additive manufacturing, the method comprising:
receiving the atomized alloy powder comprising alloy particles, the alloy particles comprising, by weight percentage:
- 1% to 4.2% nickel;
- 0.5% to 2.6% erbium;
- 0.1% to 1.5% zirconium;
- 0.05% to 0.3% yttrium;
- 0.1% to 1.2% ytterbium; and
- the balance of weight percent comprising aluminum and incidental elements and impurities,
  - wherein the alloy particles include $L1_2$ precipitates having an $Al_3X$ composition, where X is at least one of: erbium, zirconium, yttrium, and ytterbium;
conducting additive manufacturing with the atomized alloy powder to generate a manufactured article; and
aging the manufactured article in a heated container for a period of time.

19. The method according to claim 18, further comprising:
removing the manufactured article from the heated container; and
cooling the manufactured article at room temperature resulting in an aged manufactured article.

20. The method according to claim 18, wherein the aged manufactured article has an ultimate tensile strength of at least 55 ksi at 22° C.;
wherein the aged manufactured article is capable of passing a fatigue test without failure, the fatigue test including a stress amplitude of 15 ksi, a frequency of 50 Hz, an r ratio of −1, and a number of cycles being 10,000,000; and
wherein the aged manufactured article has an ultimate tensile strength of at least 20 ksi at 250° C.

* * * * *